United States Patent [19]

Ouchi

[11] Patent Number: 5,332,964
[45] Date of Patent: Jul. 26, 1994

[54] ROLLING BEARING UNIT WITH PERMANENT MAGNET, COIL AND BACK YOKE FOR SENSING ROTATIONAL SPEED OF AUTOMOTIVE WHEEL

[75] Inventor: Hideo Ouchi, Sagamihara, Japan
[73] Assignee: NSK Ltd., Tokyo, Japan
[21] Appl. No.: 962,468
[22] Filed: Oct. 16, 1992
[30] Foreign Application Priority Data Oct. 16, 1991 [JP] Japan .................. 3-294824

[51] Int. Cl.$^5$ .................. G01P 3/488; F16C 32/00
[52] U.S. Cl. .................. 324/174; 384/448
[58] Field of Search .................. 324/173, 174, 207.15, 324/207.25; 384/446, 448; 310/68 B, 168

[56] References Cited

U.S. PATENT DOCUMENTS

| 4,069,435 | 1/1978 | Wannerskog et al. ............ 310/168 |
| 4,904,936 | 2/1990 | Richmond .................. 324/174 |
| 5,140,261 | 8/1992 | Seo et al. .................. 324/173 |
| 5,148,104 | 9/1992 | Ishikawa .................. 324/173 |

FOREIGN PATENT DOCUMENTS

| 0401464 | 12/1990 | European Pat. Off. . |
| 2814606 | 10/1979 | Fed. Rep. of Germany ...... 324/174 |
| 484850 | 1/1973 | Japan . |
| 63-166601 | 7/1988 | Japan . |

Primary Examiner—Gerard R. Strecker
Attorney, Agent, or Firm—Helfgott & Karas

[57] ABSTRACT

A rolling bearing unit for sensing rotational speed comprising a rotating inner ring member of a magnetic material with an inner raceway, a stationary outer ring member with an outer raceway to oppose the inner raceway, a plurality of rolling bodies between the inner raceway and the outer raceway so that the inner ring member is rotatable freely relative to the outer ring member, a pulse rotor attached to the rotating inner ring member so as to rotate in a coaxial relationship with the rotating inner ring member during use, a sensor supported on the stationary outer ring member so as to face the pulse rotor and comprising a pole piece of magnetic material facing the pulse rotor, a coil wound around the pole piece, a permanent magnet axially in contact with the pole piece, and a back yoke of a magnetic material with a base end portion axially in contact with the permanent magnet and a tip end portion in proximity to the rotating inner ring.

2 Claims, 3 Drawing Sheets

ROLLING BEARING UNIT WITH PERMANENT MAGNET, COIL AND BACK YOKE FOR SENSING ROTATIONAL SPEED OF AUTOMOTIVE WHEEL

FIELD OF THE INVENTION

The present invention relates to improvements in a rolling bearing unit for sensing rotational speed, which supports the wheel of a vehicle so as to rotate freely and also detects the rotational speed of the wheel.

BACKGROUND OF THE INVENTION

Up until now rolling bearing units for sensing rotational speed are used to support a vehicle wheel freely rotatably and also to detect the rotational speed of the wheel. An example of the rolling bearing units is shown in FIG. 4.

In FIG. 4, an inner ring means comprises a hub 1. The hub 1 is provided with a flange 2 radially extending from an outer peripheral surface thereof for supporting a wheel and a disc rotor of a braking device (not shown). A first inner raceway 3a is formed directly on an axially central portion of the outer peripheral surface of the hub 1, while a second inner raceway 3b is formed on an outer peripheral surface of an inner ring 4 which is fittingly engaged on an axially inner end portion (right end portion in FIG. 4) of the hub 1. A shoulder portion 6 is formed on an outer peripheral face of the hub 1 between the first and second raceways 3a and 3b.

A nut 5 is threaded onto a male-threaded portion formed on an outer peripheral surface of the axially inner end portion of the hub 1, and the inner ring 4 is fixedly clamped between the nut 5 and the shoulder portion 6.

A cylindrical portion 7 with a cylindrical outer peripheral face is formed on the axially inner end of the hub 1 so as to protrude axially inward through the nut 5 (toward the right in FIG. 4).

A disk-shaped or annular pulse rotor 8 made of a magnetic material such as steel is press fitted onto the protruding cylindrical portion 7 of the hub 1. A ribbed portion 9 having alternate grooves and ridges in a circumferential direction is formed on the axially inner face (right side face in FIG. 4) of the pulse rotor 8.

An outer ring means comprises a cylindrical outer ring 10 which is provided around the hub 1 with a space 14 therebetween. The outer ring 10 is provided with a flange 11 radially extending from an outer peripheral face thereof and supported by a suspension unit arm (not shown) by means of the flange 11.

First and second outer raceways 12a and 12b are formed on respective portions of the inner peripheral surface of the outer ring 10 to oppose the inner ring raceways 3a and 3b, respectively. A plurality of rolling bodies 13 are provided in the space 14 between the inner raceways 3a and 3b and the outer raceways 12a and 12b, so that the hub 1 is free to rotate inside the outer ring 10.

Furthermore, a seal 27 is supported in the opening section of the axially outer end (left end in FIG. 4) of the outer ring 10. The seal 27 has an inner rim which comes into slidable contact with a portion of the outer peripheral surface of the hub 1, thereby covering the outer end opening of the space 14 to accommodate the plurality of rolling bodies 13.

Further, the axially inner end portion (right end in FIG. 4) of the outer ring 10 is provided with a metal cover 15 formed through deep drawing and engagingly fitted into the opening of the end portion of the outer ring 10.

A rotational speed sensing sensor 16 is supported on the metal cover 15 such that it faces the ribbed portion 9 on the pulse rotor 8.

It should be noted that the hub 1 rotates relative to the outer ring 10 while the cover 15 remains stationary with the outer ring 10 and that the sensor 16 is adapted to detect the rotational speed of the hub 1.

The sensor 16 comprises a pole piece 17 of magnetic material. The pole piece 17 is provided with an axially outer end face (left end face in FIG. 4) which faces the ribbed portion 9 of the pulse rotor 8. The sensor 16 also has a coil 18 which is wound around the periphery of the pole piece 17, and a permanent magnet 19 the axially outer end face of which abuts against the axially inner end face (right end face in FIG. 4) of the pole piece 17. The permanent magnet 19 is magnetized in the axial direction (left to right in FIG. 4), so that the pole piece 17 is arranged in contact with one pole of the permenent magnet 19.

With the rolling bearing unit for sensing rotational speed constructed as above, rotation of the hub 1 inside the outer ring 10 is made possible by means of the plurality of rolling bodies 13 provided between the inner raceway 3a and 3b and the outer ring raceway 12a and 12b. Furthermore, the rotational speed of the hub 1 is sensed by the sensor 16 as detailed hereinafter.

That is to say, a voltage is induced in the coil 18 wound around the pole piece 17 of the sensor 16, changing in accordance with the alternative change in distance between the axially outer end face of the pole piece 17 and the ribbed portion 9 on the axially inner end face of the pulse rotor 8. The frequency of the alternative change of the voltage is proportional to the rotational speed of the hub 1 to which the pulse rotor 8 is mounted. Hence if the signal from both ends of the coil 18 is input to a controller (not shown in the figure), the rotational speed of a wheel fixed to the hub 1 may be obtained and used for control of e,g, an antilock braking system (ABS) or traction control system (TCS).

With the conventional rolling bearing unit for sensing rotational speed constructed as above, however, the output from the rotational speed sensor 16 is generally not sufficient even when the wheel and therefore the hub 1 are rotating.

Specifically, in order to obtain a high output, it is necessary to have a high magnetic flux density passing through the pole piece 17 which is wound by the coil 18. With the conventional construction, the magnetic flux emits from the inner end face of the permanent magnet 19 (right end of FIG. 4) as shown in FIG. 5, and passes through the composite resin 20 (FIG. 4) in which the sensor 16 is buried and through the air space. It then reaches the pulse rotor 8 and returns to the outer end face of the permanent magnet 19 via the pole piece 17 as shown in FIG. 5.

With the conventional construction, the magnetic flux from the permanent magnet 19 must pass through the composite resin 20 having a high magnetic reluctance and the air space, covering a relatively long distance, so that over this distance, the magnetic flux is weakened. This results in a reduction in the flux density in the pole piece 17. Consequently even when the pulse rotor 8 rotates, a sufficiently high voltage is not produced, resulting in that wheel speed detection becomes unreliable.

SUMMARY OF THE INVENTION

The rolling bearing unit for sensing rotational speed of the present invention addresses the above mentioned problems, and comprises a first rotating ring means having a first raceway on a peripheral surface thereof and adapted to rotate during use of the bearing unit, a second stationary ring means having a second raceway on a peripheral surface thereof so as to oppose the first raceway with a space therebetween, a plurality of rolling bodies provided in the space between the first raceway and the second raceway so that the first and second ring means may rotate freely relative to each other, a pulse rotor fixedly attached to the first rotating ring means of a magnetic material, and adapted to rotate in a coaxial relationship with the first rotating ring means, and a sensor supported on the second stationary ring means so as to axially face the pulse rotor and comprising a pole piece of magnetic material with a first axial end face thereof facing the pulse rotor, a coil wound around the pole piece, a permanent magnet with a first axial end face in contact with a second axial end face of the pole piece, and a back yoke made of a magnetic material having a base end portion thereof in contact with a second axial end face of the permanent magnet and a tip end portion thereof arranged in proximity to the first rotating ring means.

DESCRIPTION OF THE PREFERRED EMBODIMENTS

Figure 1:
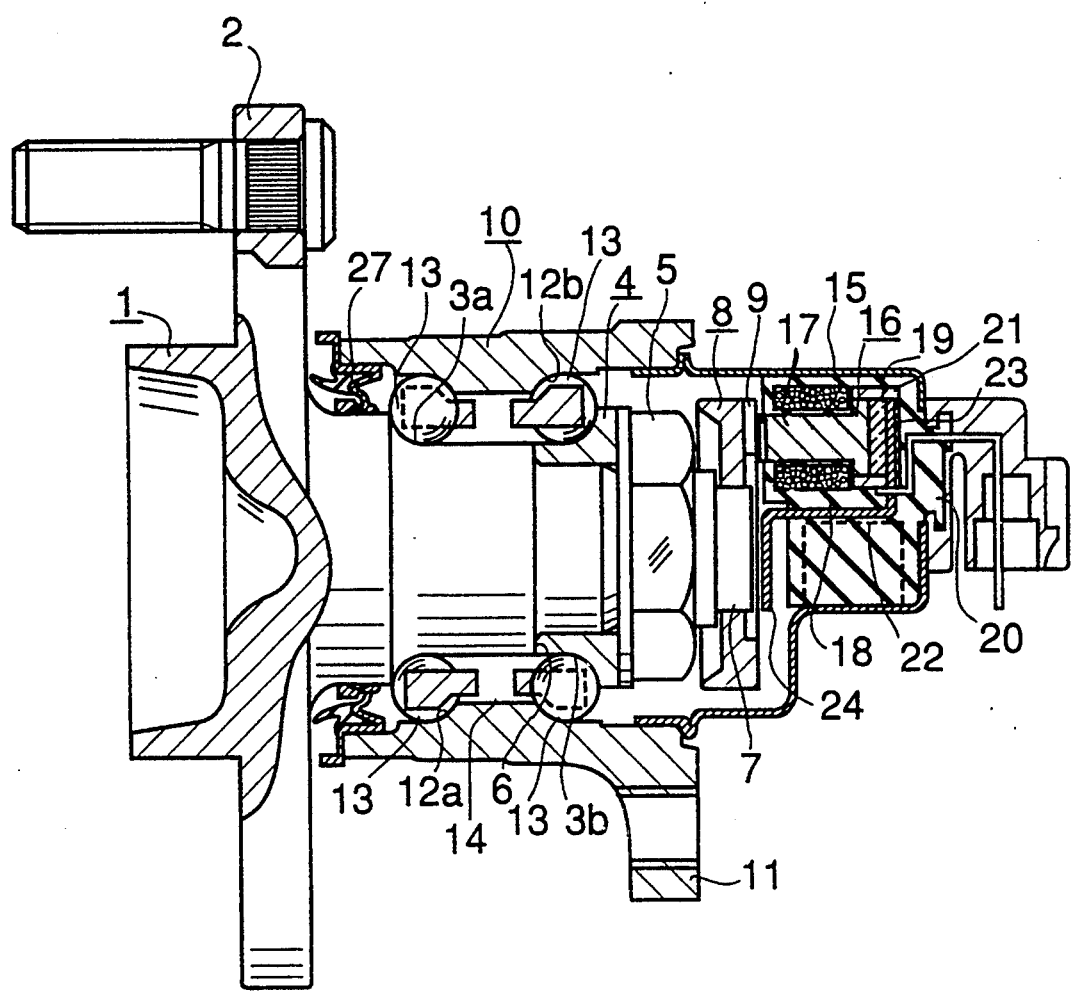
FIG. 1 is a cross-sectional view of an embodiment according to the present invention.
Figure 2:
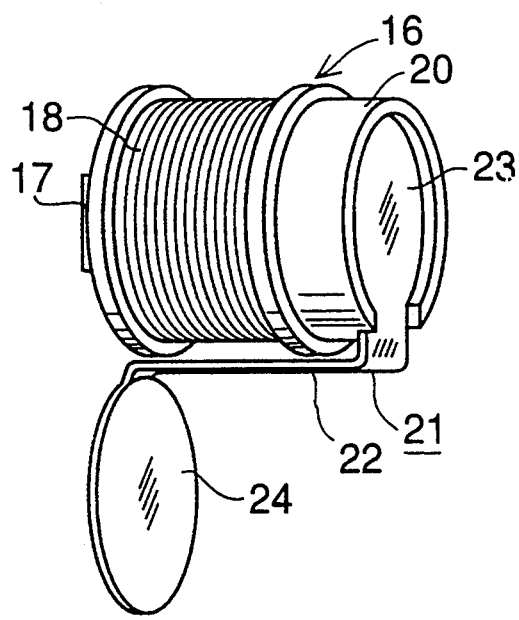
FIG. 2 is a perspective view showing the sensor portion only.
Figure 3:
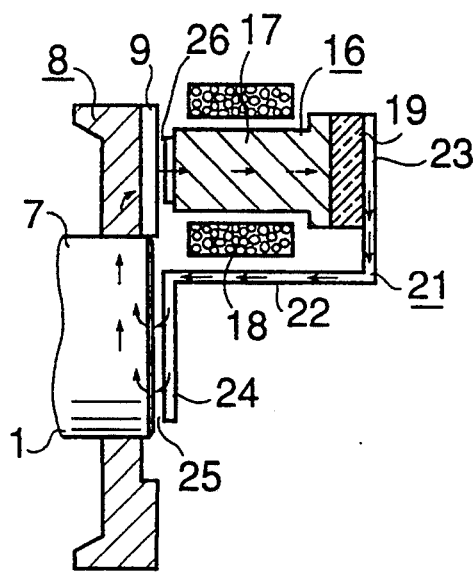
FIG. 3 is a cross-sectional view showing the parts making up the magnetic circuit in accordance with the construction of the present invention in FIG. 1.
Figure 4:
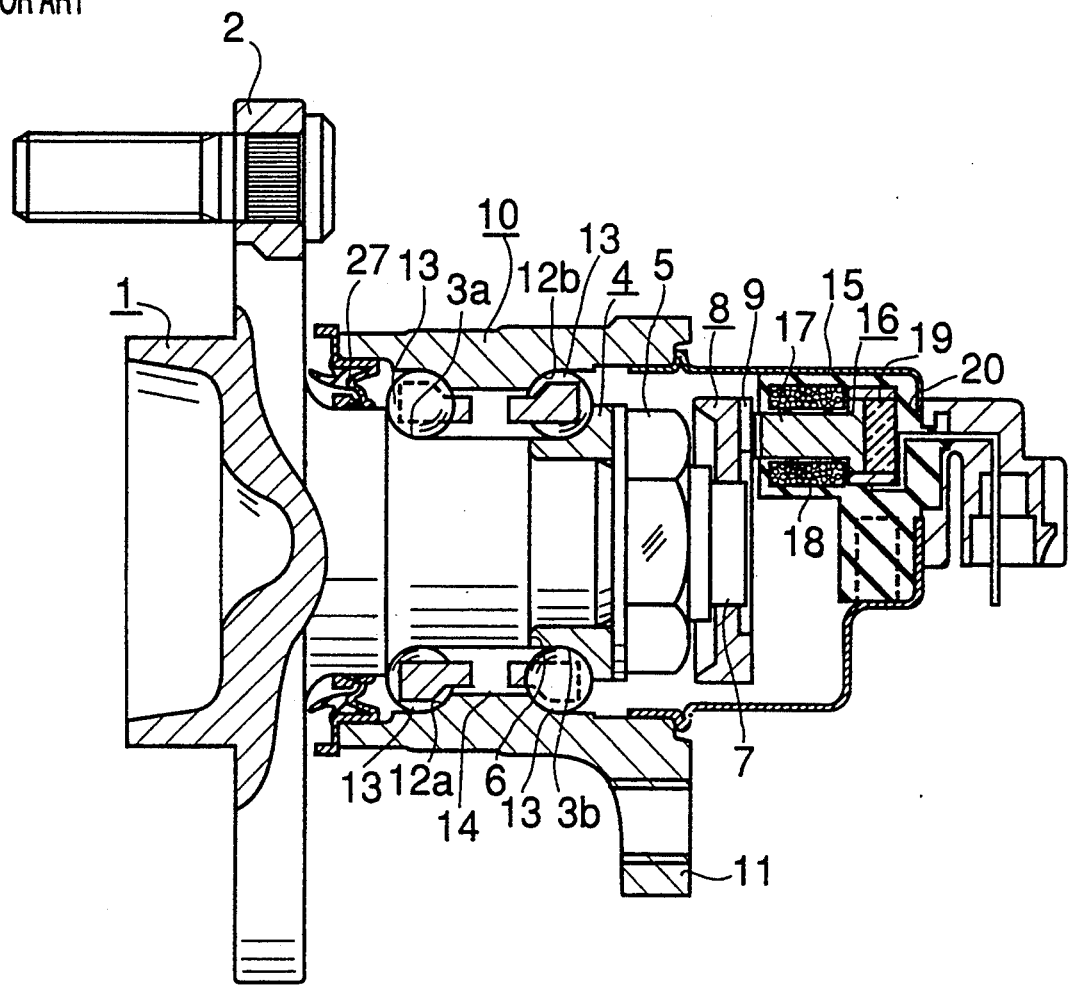
FIG. 4 is a cross-sectional view showing an example of a conventional construction.
Figure 5:
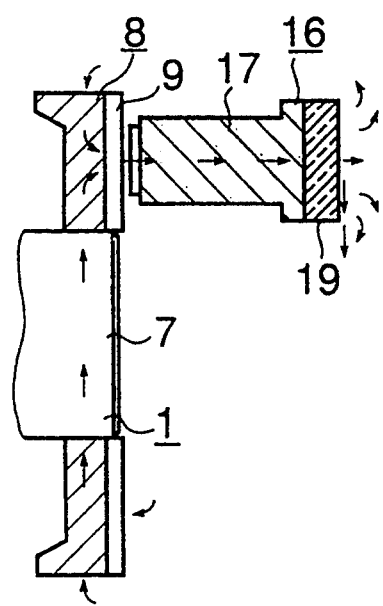
FIG. 5 is a cross-sectional view of the parts making up the magnetic circuit in accordance with the conventional construction of FIG. 4.

FIGS. 1-3 show an embodiment of the present invention. The construction of the rolling bearing unit for sensing rotational speed of the present invention is substantially the same as that of the above mentioned conventional bearing unit shown in FIGS. 4 and 5 except for the fact that a back yoke 21 is fitted into the sensor 16 to enable a high voltage to be induced in the sensor 16 when the hub 1 rotates. Hence, similar parts are identified with the same symbols, and their description is omitted from the following description of the features of the present invention. But, it should be noted that in the present invention, the hub 1 and therefore the cylindrical portion 7 are made of a magnetic material such as bearing steel.

The back yoke 21 is formed through punching from a magnetic material such as sheet metal to comprise first and second disk portions 23 and 24 connected by a band-shaped connecting portion 22. The first and second disc portions 23 and 24 are bent at right angles with reference to the connecting portion 22 in opposite directions so as to form a crank type configuration.

The first disc portion 23 is embedded in the composite resin material 20 together with pole piece 17, coil 18 and permanent magnet 19 when assembling the sensor 16 inside the cover 15. In the assembled condition, the axially outer face of the disc portion 23 (left end face in FIG. 1) and the axially inner face of the permanent magnet 19 (right end face in FIG. 1) come into contact with each other.

The second disc portion 24 opposes the axially inner face (right end face in FIG. 1) of the cylindrical portion 7 of the hub 1, so that, when the cover 15 housing the sensor 16 is fitted into the opening at the axially inner end (right end in FIG. 1) of the outer ring 10, a very small gap 25 exists between the axially inner face of the cylindrical portion 7 and the axially outer face of the second disk portion 24.

As a result, with the rolling bearing unit of the present invention for sensing rotational speed, the magnetic circuit is formed as shown in FIG. 3 passing through the permanent magnet 19, the back yoke 21, the small gap 25 existing between the back yoke 21 and the cylindrical portion 7 on the hub 1, the cylindrical portion 7, the pulse rotor 8, the small gap 26 existing between the ribbed portion 9 on the axially inner face of the pulse rotor 8 and the axially outer face (left end face in FIG. 1) of the pole piece 17, and the pole piece 17.

It should be noted that except for the small gaps 25 and 26, all parts making up the magnetic circuit are made of a magnetic material having small magnetic reluctance. Furthermore, although the small gaps 25 and 26 at two locations consist of air which has a high magnetic reluctance, since these gaps 25 and 26 cover only a small distance, the increase in magnetic reluctance with passage through the air gaps 25 and 26 is kept to a minimum.

As a result, the magnetic flux flowing in the magnetic circuit between both end faces of the permanent magnet 19 can be kept large, so that a high voltage is induced in the coil 18 wound around the pole piece 17.

In operation of the rolling bearing unit of present invention for sensing rotational speed constructed above, the wheel is supported by a suspension unit so as to rotate freely, and the function of the rolling bearing unit in detecting the rotational speed of the wheel is substantially the same as for the conventional rolling bearing unit for sensing rotational speed.

In particular, with the rolling bearing unit of the present invention for sensing rotational speed, the magnetic flux from the axially inner end face or second axial end face of the permanent magnet passes through the back yoke of magnetic material to the pulse rotor via the end portion of the hub. It then returns from the pulse rotor to the axially outer end face or first axial end face of the permanent magnet via the pole piece. Over this distance, the magnetic flux passes generally substantially through magnetic materials except for the small gaps between the back yoke and the rotating end portion of the hub and between the pulse rotor and the axially outer end face of the pole piece. As a result, loss of the magnetic flux flowing along the circuit from the second axial end face to the first axial end face of the permanent, t magnet can be kept to a minimum, so that the voltage produced in the coil wound around the pole piece can be increased.

With the rolling bearing unit of the present invention constructed as above, even if a permanent magnet with a relatively weak magnetic force is used, it is possible to obtain a sufficiently large output from the sensor for sensing rotational speed. Consequently, reliable detection of rotational speed of the wheel is facilitated so that ABS and TCS control can be suitably carried out.

While there have been described herein what are considered to be preferred embodiments of the present invention, other modifications of the invention will be apparent to those skilled in the art from the teachings herein, and the appended claims should cover all such modifications within the spirit and scope of the invention.

Accordingly, what is desired to be secured by Letters Patent of the United States is the invention as defined in the claims, I claim:

1. A rolling bearing unit for sensing rotational speed of a rotatable member, comprising:

said rotatable member which is of a magnetic material and has a shaft terminating in an end face, a first rotating ring means secured to the rotatable member and having a first raceway on a peripheral surface thereof, a second stationary ring means having a second raceway on a peripheral surface thereof so as to oppose the first raceway with a space therebetween, a plurality of rolling bodies provided in the space between the first raceway and the second raceway so that the first and second ring means may rotate freely relative to each other, an annular pulse rotor fixedly attached to the shaft of said rotatable member proximate said end face and adapted to rotate in a coaxial relationship with the rotatable member, and a sensor for sensing said rotational speed of said rotatable member and being supported on the second stationary ring means so as to axially face the pulse rotor, and comprising a pole piece of magnetic material with a first axial end face thereof facing the pulse rotor, a coil wound around the pole piece, a permanent magnet with a first axial end face in contact with a second axial end face of the pole piece, and a back yoke made of a magnetic material having a base end portion thereof in contact with a second axial end face of the permanent magnet and a tip end portion thereof arranged in proximity to and facing the end face of the shaft.

2. A rolling bearing unit for sensing rotational speed of a rotatable member, comprising:

said rotatable member being a rotatable shaft member of a magnetic material terminating in an end face having a first raceway on a peripheral surface thereof, a stationary ring means having a second raceway on a peripheral surface thereof so as to oppose the first raceway with a space therebetween, a plurality of rolling bodies provided in the space between the first raceway and the second raceway so that the shaft member and ring means may rotate freely relative to each other, an annular pulse rotor fixedly attached to the shaft member proximate said end face and adapted to rotate in a coaxial relationship with the shaft member, and a sensor for sensing said rotational speed of said rotatable member and being supported on the stationary ring means so as to axially face the pulse rotor, and comprising a pole piece of magnetic material with a first axial end face thereof facing the pulse rotor, a coil wound around the pole piece, a permanent magnet with a first axial end face in contact with a second axial end face of the pole piece, and a back yoke made of a magnetic material having a base end portion thereof in contact with a second axial end face of the permanent magnet and a tip end portion thereof arranged in proximity to and facing the end face of the shaft member.

* * * * *